United States Patent [19]

Blazek et al.

[11] Patent Number: 5,029,607

[45] Date of Patent: Jul. 9, 1991

[54] TAMPER-RESISTANT FLUID CONNECTOR

[75] Inventors: Frank V. Blazek, Monroeville; David J. Rath, Mt. Pleasant; William L. Wian, Youngwood, all of Pa.

[73] Assignee: Gas Research Institute, Chicago, Ill.

[21] Appl. No.: 451,429

[22] Filed: Dec. 15, 1989

[51] Int. Cl.$^5$ .......................... F16L 5/00; F16L 37/28
[52] U.S. Cl. .................................. 137/360; 251/89.5; 251/149.9
[58] Field of Search ...................... 251/89.5, 96, 149.9, 251/149.5, 149; 137/360

[56] References Cited

U.S. PATENT DOCUMENTS

| | | | |
|---|---|---|---|
| 197,520 | 2/1964 | Bellek . | |
| 283,007 | 3/1986 | Henkel | D8/353 |
| 948,753 | 1/1910 | Chamberlain | 137/360 |
| 958,126 | 5/1910 | Horan . | |
| 1,489,326 | 4/1924 | McMasters . | |
| 1,490,287 | 4/1924 | Morse . | |
| 2,738,475 | 7/1953 | Beach | 339/36 |
| 2,997,520 | 8/1961 | Kinsman | 174/67 |
| 3,198,373 | 8/1965 | Ramsing | 220/242 |
| 3,204,807 | 9/1965 | Ramsing | 220/24.3 |
| 3,474,810 | 10/1969 | Welsh | 137/75 |
| 3,477,689 | 11/1969 | Berghoefer et al. | 251/149.9 |
| 3,532,101 | 10/1970 | Snyder | 251/149.7 |
| 3,565,103 | 2/1971 | Maselek | 137/360 |
| 3,646,965 | 3/1972 | Swartz | 251/149.9 |
| 3,809,122 | 5/1974 | Berg | 251/149.9 |
| 3,826,464 | 7/1974 | Berghofer | 251/149.9 |
| 4,036,396 | 7/1977 | Kennedy et al. | 220/242 |
| 4,346,701 | 8/1982 | Richards | 137/614.06 |
| 4,451,101 | 5/1984 | Davis | 220/242 |
| 4,662,396 | 5/1987 | Avnon | 251/149.9 |
| 4,688,596 | 8/1987 | Liebmann et al. | 137/360 |
| 4,844,409 | 7/1989 | Lackler et al. | 251/149.9 |
| 4,901,916 | 2/1990 | Avelöv | 137/360 |

FOREIGN PATENT DOCUMENTS

396731  2/1933  United Kingdom ............... 251/89.5

Primary Examiner—A. Michael Chambers
Attorney, Agent, or Firm—Thomas W. Speckman; Douglas H. Pauley

[57] ABSTRACT

A tamper-resistant fluid connector is mounted to a wall for quickly connecting and disconnecting a fluid supply line to an appliance or other device. The tamper-resistant fluid connector has a housing body with an inlet. A plug is rotatably secured within the housing body. The plug has a plug through hole that is communication with the inlet, in an open position of the tamper-resistant fluid connector. The plug is retained within housing body and is lockable in a closed position. In the closed position of the tamper-resistant fluid connector, communication between the plug through hole and the inlet is interrupted. When a removable connector assembly, which defines a connector through hole, is engaged with the housing body and then rotated with respect to the housing body, the plug is unlocked from the closed position and, the inlet, the plug through hole and the connector through hole are in communication. The removable connector assembly has an outlet which is in communication with the connector through hole.

35 Claims, 6 Drawing Sheets

TAMPER-RESISTANT FLUID CONNECTOR

BACKGROUND OF THE INVENTION

Field of the Invention

This invention relates to a tamper-resistant fluid connector that is automatically locked in a closed position when a removable connector assembly is removed from a housing body and fluid flow through the housing body is interrupted regardless of whether the removable connector assembly is either intentionally or accidentally removed from the housing body.

Description of the Prior Art

Many different apparatuses have been designed for connecting gas supply lines to appliances or other devices. However, there is still a need for a reliable connector that is quickly, easily and positively sealed and locked in an open position, permitting fluid flow, and also locked in a closed position interrupting fluid flow. The existing apparatuses fail to solve this need.

U.S. Pat. No. 4,844,409 teaches a medical gas adapter and an outlet for delivering gas. The adapter has keys which fit into keying cavities of the outlet. When the adapter is inserted into the outlet, a release knob is rotated and the adapter is moved into a locked position, with respect to the outlet, and the various valving mechanisms within the outlet are opened. However, a disadvantage of the '409 patent is that there is no mechanism for locking the outlet in a closed position.

U.S. Pat. No. 4,662,396 teaches a connector assembly for connecting fluid conduits. The '396 patent teaches that one fitting is secured to a housing which encloses a ball valve. Upon inserting another fitting into the housing and rotating the ball valve, the inserted fitting is locked to the housing, the ball valve is open and the two fittings are in communication. The '396 patent also teaches a disadvantageous design because there is no mechanism to prevent the valve from being moved to the open position without connecting the other fitting.

U.S Pat. No. 3,646,965 teaches a gas supply connector and regulator for delivering an adjustable flow of gas. A hose is attached to a regulator assembly which has a handle that locks itself to the valve assembly and actuates a pin which then opens a poppet type valve. A disadvantage of the device taught by the '965 patent is that the poppet type valve does not have to be in the closed position when the attached hose is removed. The poppet valve is closed through action of the gas pressure rather than directly by manual or physical rotation of the device handle. Another disadvantage of the device taught by the '965 patent is that the poppet valve can be easily displaced by inserting a screwdriver or similar type of rod when the mating connector is removed, causing gas to escape to the atmosphere.

U.S. Pat. No. 3,474,810 teaches a plug-in gas line connection. The '810 patent teaches a poppet type valve which seals a housing by a spring exerting a force on the poppet valve. A disadvantage is that this type of valve can be easily displaced by inserting a screwdriver or similar type of rod. The valve design disclosed offers no way of preventing tampering with the valve when the connector is not connected to the valve. Hence, this design could not be used to prevent the accidental flow of gas when the valve is not in use.

U S Pat. No. 3,532,101 teaches a low pressure gas coupler. A spring force holds the cylindrical valve in a closed position when the coupling is not connected. The '101 patent teaches a poppet type valve and a fusible solder ring positioned in a hose connection part of the assembly for interrupting the flow of gas when the source is removed.

U.S. Pat. No. 3,809,122 teaches a quick connect, hydraulic fluid coupling which has a poppet type valve. As taught by the '122 patent, two sections each have a valve which automatically closes and prevents the escape of hydraulic fluid when in the uncoupled position. The fluid coupling is connected by rotating a lever which locks the two sections together and opens the valves. Again, this type of poppet valve teaches no way of preventing accidental escape of fluid and has no way of preventing someone from tampering with the valve and moving the valve to the open position.

U.S. Pat. No. 4,346,701 teaches a gas flow unit, such as a vaporizer, mounted on a gas administration apparatus, such as an anaesthesia machine. U.S. Pat. Nos. 958,126, 1,489,326 and 1,490,287 all teach a fusible plug mounted in a passageway of a body. When the body reaches a predetermined temperature, the plug falls by gravitational force along the passageway and blocks the flow of gas.

SUMMARY OF THE INVENTION

It is an object of this invention to provide a tamper-resistant fluid connector which automatically prevents fluid flow in the event the tamper-resistant fluid connector is disconnected, either intentionally or accidentally.

It is another object of this invention to provide a tamper-resistant fluid connector that is lockable in a closed position.

It is another object of this invention to provide a tamper-resistant fluid connector that does not require tools or hardware to quickly and easily connect and disconnect the tamper-resistant fluid connector.

It is yet another object of this invention to provide a tamper-resistant fluid connector that is mounted behind a wall covering and is easily and conveniently accessible to a user.

It is still another object of this invention to provide a tamper-resistant fluid connector which has a plug that is rotatably secured within a housing body and the plug can be moved to an open position only upon inserting and rotating the removable connector assembly, with respect to the housing body.

The above objects are achieved in this invention with a tamper-resistant fluid connector that has a housing body and an inlet for connecting the housing body to a fluid supply line. In one embodiment, a wire screen or other suitable filtering material is positioned within the inlet. This device of this invention is particularly suited for a gaseous fluid, such as natural gas; however, it is apparent that the working fluid can also be a liquid or combination of a liquid and a gas.

A plug has a plug through hole which is in communication with the inlet. The plug is rotatably mounted within the housing body. In a closed position of the plug, communication between the plug through hole and the inlet is interrupted and the plug is locked with respect to the housing body. A removable connector assembly, having a connector through hole, is lockingly engagable within the housing body. When the removable connector assembly is inserted within the housing body, then rotated with respect to the housing body, the plug is unlocked from the closed position and communication between the inlet, the plug through hole and the connector through hole is established. The connector through hole is also in communication with an outlet.

In one embodiment, the housing is mounted behind a wall covering and the housing body is secured to a wall or other suitable structure. The housing body has through holes for securing the housing body to the structure with screws, nails or the like. A front cover is secured to the front side of the housing body. The front cover has a front cover bore that has a non-circular periphery. The front cover abuts an inside surface of the wall structure. A wall cover plate is secured to the housing body and abuts an outside surface of the wall structure. The wall cover plate has a wall cover plate bore which allows access to the housing body. An access door is conveniently mounted to the wall cover plate with a hinge. In the closed position, the access door abuts the wall cover plate and provides an attractive covering.

The plug has approximately a 90° bend, in one preferred embodiment of this invention. The plug preferably has a tapered plug wall and at least one body extension connected to the plug. Each body extension has a body extension through hole in communication with the plug through hole. The plug and each of the body extensions are secured to each other along a longitudinal axis. A transition from the plug wall to a body extension defines a circumferential shoulder.

A coiled spring is positioned about a body extension. One end of the spring abuts the circumferential shoulder and the other end abuts a rotatable lock plate. The lock plate slidably fits over the body extension. The lock plate is lockingly engagable with a retaining plate. The retaining plate is secured to the housing body.

In one embodiment, the lock plate has a non-circular lock plate bore. The non-circular lock plate bore is slidably mateable with the non-circular cross-sectional body extension. In a preferred embodiment, at least one tab is connected to the lock plate along a plate periphery and each tab partially projects out of a planar surface of the lock plate. The retaining plate defines a retaining plate bore. At least one retaining plate cut-away section is positioned along a retaining plate bore periphery. Each tab is lockingly engagable with a corresponding retaining plate cut-away section. In the closed position of the plug, the spring forces the lock plate to lockingly engage with the retaining plate to prevent the lock plate, which is mated with the body extension of the plug, from rotating. In order to permit fluid to flow through the tamper-resistant fluid connector when the plug is in the closed position, the lock plate must be unlocked from the retaining plate.

In designing a fluid connector, it is highly desirable to design the fluid connector so that common tools such as screwdrivers and the like cannot be used to tamper with the fluid connector, open the valve and allow fluid to escape into the environment. It is also highly desirable to provide a fluid connector that does not require any type hand or power tools to connect and disconnect the fluid connector. Additionally, it is also extremely important that a fluid connector has some type of mechanism that automatically interrupts the flow of fluid in the event the fluid connector is either intentionally or accidentally disconnected.

According to this invention, the removable connector assembly has an uncommon design which cannot be easily duplicated. Whereas other existing fluid connectors can be opened by manipulating a bent wire or other types of tools within the housing body, the present invention makes this type of tampering virtually impossible.

In this invention, the removable connector assembly can be inserted within and rotated with respect to the housing body. By inserting and rotating the removable connector assembly, the plug is moved to the open position. Without the removable connector assembly, the plug cannot be moved to the open position, except by either destroying the housing body or disassembling it. When the removable connector assembly is removed, the plug is automatically locked in the closed position. Hence, the user of the tamper-resistant fluid connector according to this invention does not have to be concerned with any fluid escaping from the tamper-resistant fluid connector once the removable connector assembly is removed from the housing body. Additionally, the present invention eliminates any rotating and/or pushing pins, knobs, levers, handles and the like to stop the fluid flow and does not require any tools or mechanical skills to operate the tamper-resistant fluid connector.

In one preferred embodiment, the uncommon design of the removable connector assembly includes a C-wall projecting outwardly from an end of a connector collar. The C-wall section abuts the lock plate in the open position. When the removable connector assembly is inserted and rotated with respect to the housing body, the C-wall unlocks the lock plate from the retaining plate and the lock plate is then rotated with respect to the retaining plate. The removable connector assembly has a retaining ring which abuts an end of a hose connector. The hose connector is partially retained within the connector collar. The retaining ring has a non-circular retaining bore with a retaining ring periphery about the non-circular retaining bore. When the removable connector assembly is inserted within the housing body, the non-circular bore lockingly engages with the non-circular body extension.

In one preferred embodiment, the removable connector assembly has a gasket for sealing the hose connector of the removable connector assembly with respect to the body extension of the plug. The gasket prevents fluid from escaping into the environment. The gasket is secured to an inner wall of a connector collar of the removable connector assembly.

The connector collar is rotatably lockable within the housing body. In a preferred embodiment, the connector collar is rotatably lockable within an insert ring. The insert ring is positioned within a central bore of the housing body. The insert ring defines an insert bore. At least one lug projects outwardly from the connector collar. The insert ring is secured to the housing body by the front cover. The insert ring has an insert cut-away that engages with each lug of the connector collar. When each lug is engaged with the insert bore cut-away section, the removable connector assembly is locked with respect to the housing body and the plug is in the open position.

To provide additional securing and locking of the removable connector assembly with respect to the housing body, each insert cut-away section has a leaf spring finger or spring clip located within each of the insert cut-away sections. The leaf spring finger or spring clip forces each of the lugs to lock within each of the insert cut-away sections.

In one preferred embodiment of this invention, the outlet is a shaft secured to an outlet end of the hose connector of the removable connector assembly. The shaft defines an outlet through hole which is in communication with the connector through hole. The shaft may have a threaded connection for connecting a tube or other suitable hose that is connected to an appliance or other device.

BRIEF DESCRIPTION OF THE DRAWINGS

Further features of this invention will be apparent from the following more detailed description taken in conjunction with the drawings, wherein:

FIG. 7A is a partial side view of an end portion of the connector collar, as shown in FIG. 7;

DESCRIPTION OF THE PREFERRED EMBODIMENTS

Figure 1:
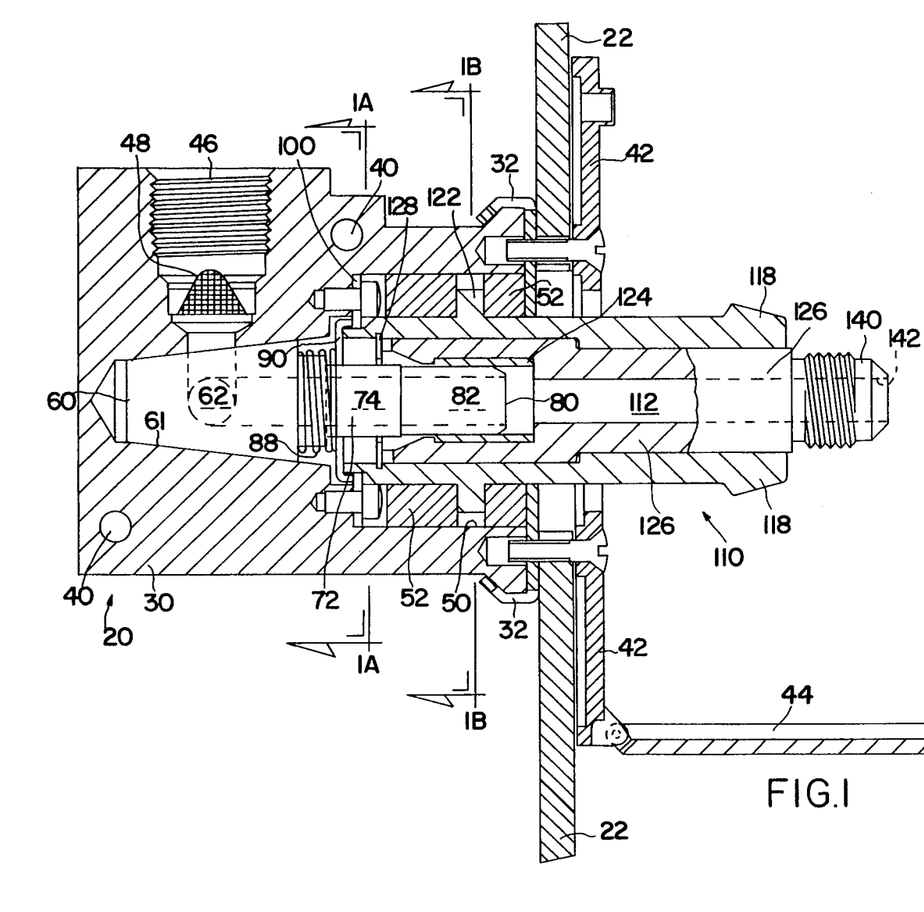
FIG. 1 is a partial cross-sectional side view of a tamper-resistant fluid connector according to one embodiment of this invention.

FIG. 1 shows a preferred embodiment of tamper-resistant fluid connector 20. As shown in FIG. 1, tamper-resistant fluid connector 20 is in an open position. To achieve the open position, removable connector assembly 110 is inserted, rotated and locked with respect to housing body 30. Housing body 30 has securing means for securing tamper-resistant fluid connector 20 to a supporting structural element of wall 22. In one embodiment, the securing means comprise through holes 40. Through holes 40 are provided to secure housing body 30 to a stud, for example, or any other suitable mounting structure.

Housing body 30 has inlet means for connecting housing body 30 to a fluid supply line or conduit. In one preferred embodiment, the inlet means comprise internally threaded inlet 46. Inlet 46 does not have to be threaded and any other suitable method of connecting the fluid supply line to housing body 30 may be used. Plug 60 is sealably and rotatably mounted within housing body 30. In the open position, plug through hole 62 of plug 60 is in communication with the inlet means. Retaining means rotates, secures, and locks plug 60 within housing body 30. The retaining means can be locked in a closed position. In the closed position, neither connector through hole 112 of removable connector assembly 110 nor plug through hole 62 is in communication with inlet 46 of housing body 30.

As shown in the open position in FIG. 1, removable connector assembly 110 is locked with respect to housing body 30 since lugs 122 are engaged with and locked relative to insert ring 52. Removable connector assembly 110 defines connector through hole 112. When removable connector assembly 110 is first inserted within and then rotated with respect to housing body 30, the retaining means is unlocked from the closed position and thus permits communication between inlet means 46, plug through hole 62 and connector through hole 112. Removable connector assembly 110 has outlet means in communication with connector through hole 112.

Figures 2, 2A:
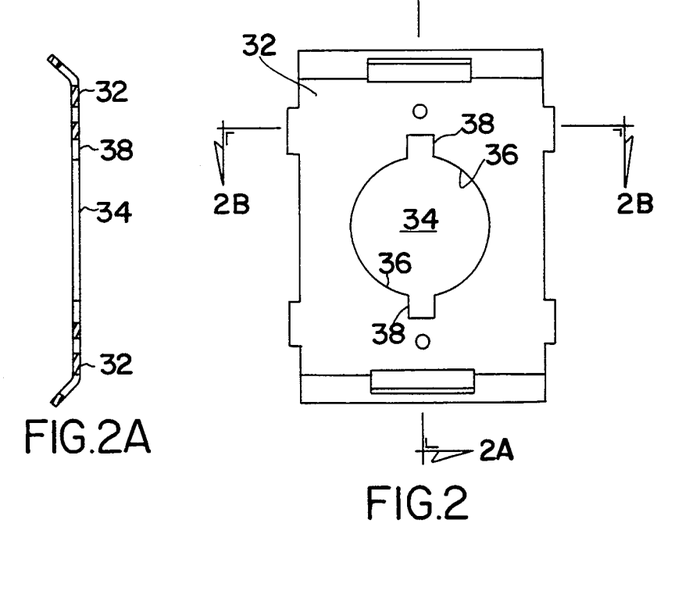
FIG. 2 is a front view of a front cover according to one embodiment of this invention.
FIG. 2A is a cross-sectional side view along line 2A—2A, as shown is FIG. 2, of the front cover.
Figure 2B:
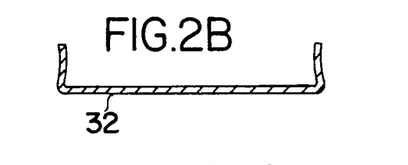
FIG. 2B is a cross-sectional top view along line 2B—2B, as shown in FIG. 2, of the front cover.

As shown in FIG. 1, front cover 32 is secured to housing body 30. Front cover 32 may be secured to housing body 30 with screws or by any other suitable fastening method. As shown in FIG. 1, front cover 32 abuts or is in proximity to an inside surface of wall 22. As shown in FIG. 2, front cover 32 has a front cover bore 34 which allows access to housing body 30. Front cover 32 has at least one cover cut-away 38 positioned about a cover periphery 36. As shown in FIG. 2 according to a preferred embodiment, front cover 32 has two cover cut-aways 38 positioned 180° apart from one another. As shown in FIG. 2, each cover cut-away has an overall rectangular shape. Although the overall rectangular shape is preferable, other suitable geometric shapes are possible as long as the shape is compatible with the shape of lugs 122. As shown in FIGS. 1, 2A and 2B, ends of front cover 32 conform to housing body 30 to ensure positive alignment and proper attachment of front cover 32 to housing body 30.

Figure 3:
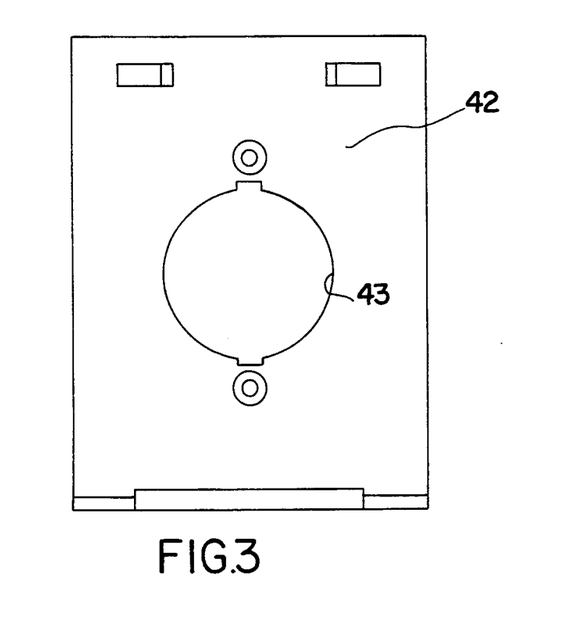
FIG. 3 is a front view of a wall cover plate according to one embodiment of this invention.

As shown in FIGS. 1 and 3, wall cover plate 42 is secured with respect to housing body 30. Wall cover plate 42 may be secured to housing body 30 with screws or any other suitable fastener. Wall cover plate 42 abuts an outside surface of wall 22. The diameter of wall cover plate bore 43 is approximately the same diameter as front cover bore 34. As shown in FIG. 3, wall cover plate bore 43 is also non-circular and preferably has two cut-away sections that correspond with cover cut-aways 38. As shown in FIG. 1, access door 44 is hingedly mounted to wall cover plate 42. In the closed position, access door 44 abuts wall cover plate 42 and removable connector assembly 110 cannot be inserted within housing body 30. Although not shown, access door 44 may be locked with respect to housing body 30. Access door 44 can be clearly labeled to identify the type of fluid being delivered through tamper-resistant fluid connector 20. Additionally, the front side of access door 44 provides an attractive cover for housing body 30.

Filter means are preferably mounted within the inlet means. As shown in FIG. 1 according to one embodiment, filter means is screen 48 which filters the fluid, preferably a gas such as natural gas, before the fluid enters plug through hole 62. In one preferred embodiment, screen 48 is a wire cloth which has a plain weave and is constructed of stainless steel, 80 mesh, 0.0057 (in.) diameter wire and has 49.5 percent open area. It is important to filter the incoming fluid before it enters plug through hole 62 to prevent foreign matter from entering and clogging tamper-resistant fluid connector 20.

Figure 4:
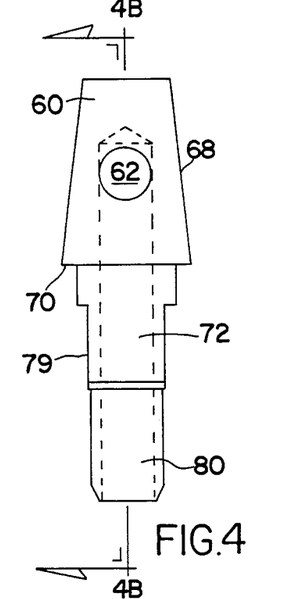
FIG. 4 is a side view of a plug according to one embodiment of this invention.
Figure 4A:
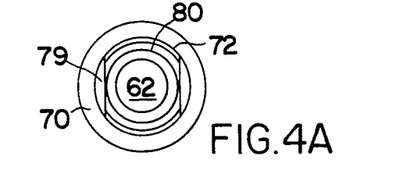
FIG. 4A is a front view of the plug as shown in FIG. 4.
Figure 4B:
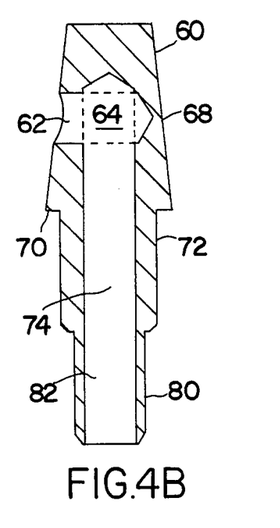
FIG. 4B is a cross-sectional side view along line 4B—4B, as shown in FIG. 4, of the plug.

As shown in FIGS. 1, 4 and 4B, plug 60 is preferably tapered. In the art, plug 60 may be referred to as a valve plug or gas cock. Although the tapered shape of plug 60 is preferred, other configurations are acceptable if they provide a suitable sealing surface and a mating shape that corresponds with tapered bore 61. Referring to FIGS. 1, 4, 4A and 4B, plug 60 defines plug through hole 62. In a preferred embodiment, plug through hole 62 has 90° bend 64, as shown in FIG. 4B. The shape of bend 64 is not critical and a wide range of angles are suitable.

Referring to FIG. 4B, plug 60 rotates about a longitudinal axis. In a preferred embodiment as shown in FIGS. 4, 4A and 4B, plug 60 has a tapered wall 68, body extension 72 and body extension 80. Although two body extensions 72 and 80 are shown according to one preferred embodiment, the number of body extensions is not critical so long as plug 60 is connectable to removable connector assembly 110. As shown in FIG. 4B, body extension 72 defines body extension through hole 74 and body extension 80 defines body extension through hole 82. Body extension 72 is connected to plug 60 near a divergent end of tapered wall 68. Body extension 72 is also aligned along the longitudinal axis of plug 60. Body extension 80 is connected to body extension 72, also along the longitudinal axis. Plug through hole 62 and body extension through holes 74 and 82 are in communication with one another. As shown in FIGS. 4 and 4B, a transition from the divergent end of tapered wall 68 to body extension 72 defines circumferential shoulder 70. As shown in FIGS. 4A and 4B, body extension 72 has a diameter which is preferably greater than a diameter of body extension 80.

Tamper-resistant fluid connector 20 has retaining means for seating plug 60 within housing body 30. In one embodiment, the retaining means comprises spring 88, lock plate 90 and retaining plate 100. As shown in FIG. 1, spring 88 forces plug 60 against housing body 30, seats plug 60 within a compatible bore within housing body 30 and thus forms a seal between plug 60 and housing body 30.

Figure 5:
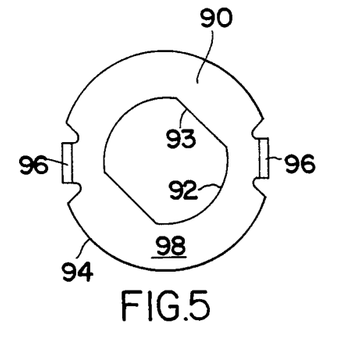
FIG. 5 is a front view of a lock plate according to one embodiment of this invention.

In a preferred embodiment as shown in FIG. 1, spring 88 is coiled and has closed ends that are not ground. In another preferred embodiment, spring 88 is made of 302 stainless steel and has a wire diameter of about 0.045 inches. It is also possible to have a spring that has closed ends that are ground or a spring with open ends that are either ground or not ground. As shown in FIG. 1, spring 88 is positioned around body extension 72. One end of spring 88 abuts circumferential shoulder 70 and an opposite end of spring 88 abuts rotatable lock plate 90. As shown in FIG. 5., lock plate 90 has a non-circular lock plate bore 92. Lock plate 90 has at least one flat 93 about lock plate bore 92. Preferably, as shown in FIG. 5, lock plate 90 has two flats 93 about lock plate bore 92. As shown in FIG. 1, lock plate 90 is slidably mateable with body extension 72.

Figure 1A:
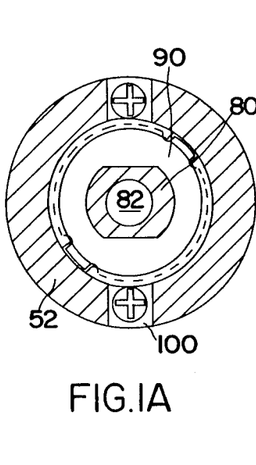
FIG. 1A is a partial cross-sectional front view along line 1A—1A, as shown in FIG. 1, of the tamper-resistant fluid connector.
Figures 5A, 6:
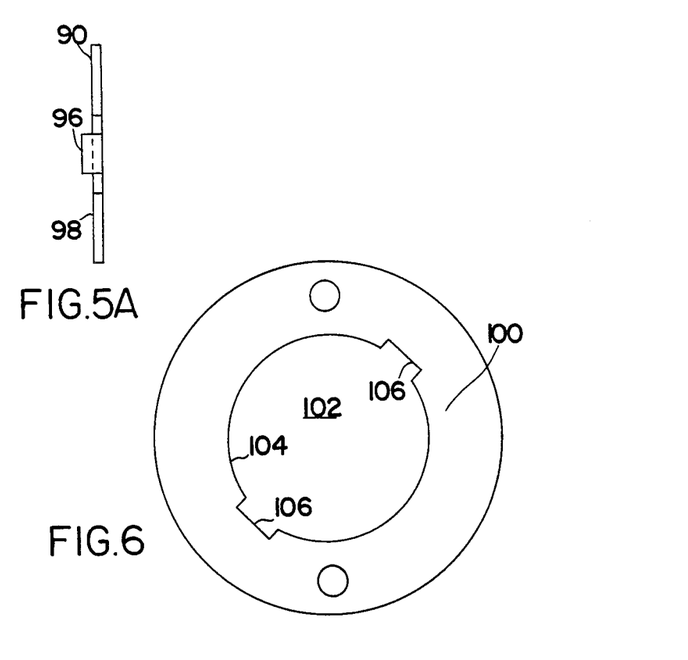
FIG. 5A is a side view of the lock plate, as shown in FIG. 5.
FIG. 6 is a front view of a retaining plate according to one embodiment of this invention.
Figure 5B:
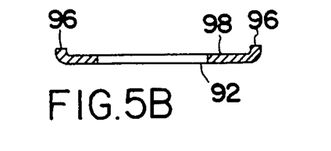
FIG. 5B is a cross-sectional bottom view of the lock plate, as shown in FIG. 5.

Retaining plate 100 is lockingly engagable with lock plate 90. As shown in FIGS. 1 and 1A, retaining plate 100 is secured with respect to housing body 30. In one embodiment as shown in FIG. 6, retaining plate 100 has two through holes for accommodating screws that secure to housing body 30. Lock plate 90 has locking means for locking lock plate 90 to retaining plate 100. As shown in FIGS. 5, 5A, and 5B, the lock means include at least one tab 96 projecting from lock plate 90. In a preferred embodiment lock plate 90 has two tabs 96. As shown in FIG. 5, each tab 96 is connected to lock plate 90 along a plate periphery 94. As clearly shown in FIGS. 5A and 5B, each tab 96 partially projects out of planar surface 98 of lock plate 90.

Retaining plate 100 has retaining means for lockingly engaging retaining plate 100 with lock plate 90. Retaining plate 100 defines retaining plate bore 102. At least one retaining plate cut-away section 106 is positioned about retaining bore periphery 104. As shown in FIG. 6, two retaining plate cut-away sections 106 are positioned 180° apart. As shown in FIG. 1, each corresponding tab 96 is lockingly engageable with each retaining cut-away section 106. The number of tabs 96 should equal the number of retaining plate cut-away sections 106. Tabs 96 and retaining plate cut-away sections 106 preferably have an overall rectangular shape cross section. However, tabs 96 and retaining plate cut-away sections 106 can have any other suitable geometric shape as long as each tab 96 can mate with each retaining plate cut-away section 106.

In a closed position of tamper-resistant fluid connector 20, not shown in the drawings, spring 88 has a spring force for locking the retaining means in the closed position. In such position, tamper-resistant fluid connector 20 is closed and plug through hole 62 and inlet 46 are not in communication. It is virtually impossible to unlock the retaining means and rotate plug 60 to the open position without using removable connector assembly 110. The uncommon shape of removable connector assembly ensures that screwdrivers, pliers, and other rods or tools cannot be used to rotate the plug into the open position.

Figure 7:
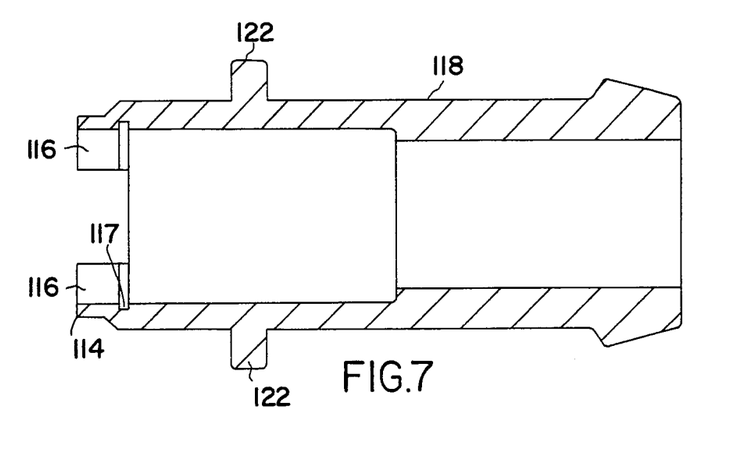
FIG. 7 is a cross-sectional side view of a connector collar along line 7—7, as shown in FIG. 7A, according to one embodiment of this invention.
Figure 7A:
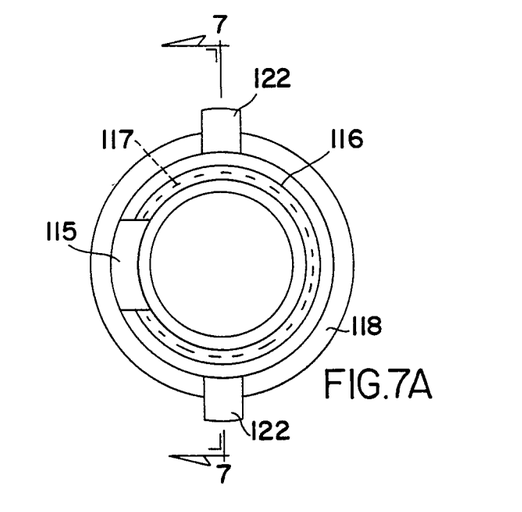
FIG. 7A is a front view of the connector collar as shown in FIG. 7.
Figure 7B:
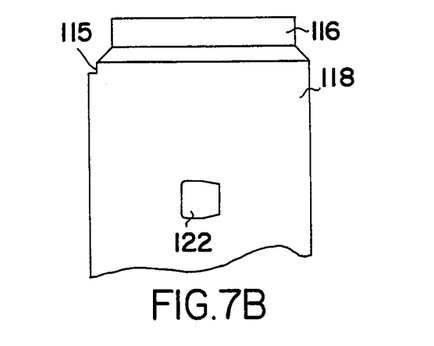
Figure 9:
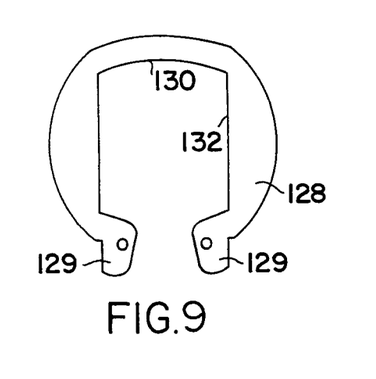
FIG. 9 is a front view of a retaining ring according to one embodiment of this invention.

As shown in FIG. 1 removable connector assembly 110 has connector collar 118. The uncommon shape of removable connector assembly 110 is shown in FIGS. 1, 7, 7A and 7B. Connector collar 118 is preferably constructed of an aluminum alloy or any other suitable material. As shown in FIGS. 7, 7A and 7B, removable connector assembly 110 has C-wall section 116 projecting outward from end 114. As shown in FIG. 1, C-wall section 116 abuts lock plate 90. In order to unlock the retaining means from the closed position, removable connector assembly 110 is inserted within and rotated with respect to housing body 30. The end of C-wall section 116 then unlocks lock plate 90 from and rotates it through action of retaining bore flats 132 of retaining ring 128, as shown in FIG. 9, with respect to retaining plate 100, which is secured to housing body 30. Although C-wall section 116 preferably has cutout section 115, or in other words is not continuous, it is apparent that C-wall section 116 can have a continuous wall provided that retaining ring 128 can be positioned within groove 117 of connector collar 118.

As shown in FIGS. 1 and 9, connector collar 118 accommodates retaining ring 128. Preferably, retaining ring 128 is constructed of stainless steel. As shown in FIG. 1, retaining ring 128 abuts an end of hose connector 126. Retaining ring 128 retains hose connector 126 within connector collar 118 at groove 117. Tabs 129 of retaining ring 128 fit within cutout section 117 of C-wall section 116 to fix the position of retaining ring 128 with respect to connector collar 118. As shown in FIG. 9, retaining ring 128 has a non-circular bore 130. As shown in FIG. 1, when removable connector assembly 110 is inserted within housing body 30, retaining bore flat 132 engages with flat 79 of body extension 72 and thus allows connector assembly 110 to rotate plug 60. As shown in FIG. 9, non-circular bore 130 preferably has two retaining bore flats 132; however, it is apparent that non-circular bore 130 can have one or more retaining bore flats 132. As shown in FIGS. 1A and 4B, non-circular body extension 72 has at least one flat 79. The outer periphery of non-circular body extension 72 must be compatible with the periphery of non-circular bore 130.

Figure 10:
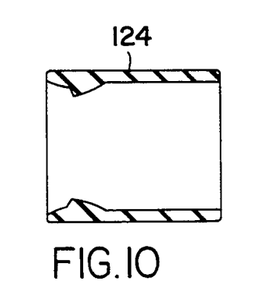
FIG. 10 is a cross-sectional side view of a gasket according to one embodiment of this invention.
Figure 11:
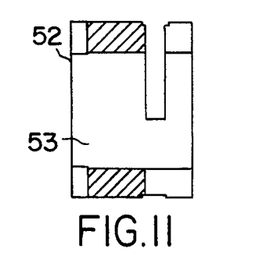
FIG. 11 is a partial cross-sectional side view of an insert ring along line 11—11, as shown in FIG. 11A, according to one embodiment of this invention.
Figure 11A:
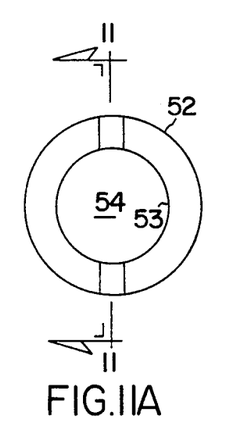
FIG. 11A is a bottom view of the insert ring according to one embodiment of this invention.
Figure 11B:
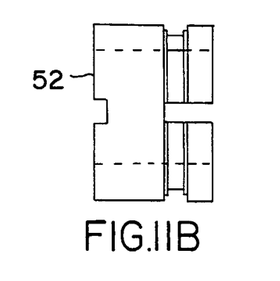
FIG. 11B is a side view of the insert ring as shown in FIG. 11.

Removable connector assembly 110 has sealing means for sealing hose connector 126 with respect to body extension 80, as shown in FIG. 1. In one embodiment as shown in FIG. 10, the sealing means comprise silicone rubber gasket 124. The sealing means may comprise any other suitable material which seals hose connector 126 to body extension 80. As shown in FIG. 1, gasket 124 is secured to inner wall 127, as shown in FIG. 8, of hose connector 126.

Figure 12:
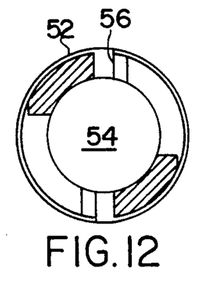
FIG. 12 is partial cross-sectional side view of the insert ring along line 12—12, as shown in FIG. 12A, according to one embodiment of this invention.
Figure 12A:
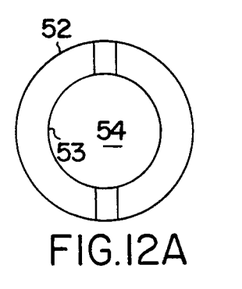
FIG. 12A is a front view of the insert ring as shown in FIG. 12.
Figure 12B:
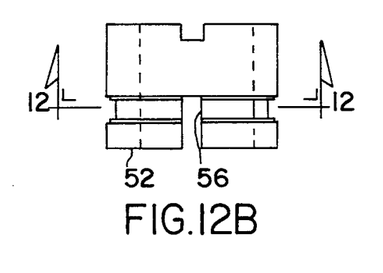
FIG. 12B is a side view of the insert ring as shown in FIG. 12.

In a preferred embodiment, removable connector assembly 110 is rotatably lockable with respect to insert ring 52 mounted within housing body 30. As shown in FIG. 1, removable connector assembly 110 is in a locked position. Insert ring 52 is mounted within central bore 50 of housing body 30. As shown in FIGS. 1, 11, 11A, 11B, 12, 12A and 12B, insert ring 52 defines insert bore 54. As shown in FIG. 1, front cover 32 secures insert ring 52 within central bore 50 of housing body 30. As shown in FIG. 1, removable connector assembly 110 forms connector collar 118. As shown in FIGS. 1, 7, 7A and 7B, at least one lug 122 projects from connector collar 118. As shown in FIGS. 1, 7, 7A and 7B, two lugs 122 project from connector collar 118 and are spaced 180° apart. Insert bore 54 has insert bore locking means for engaging with each lug 122 to lock connector collar 118 with respect to housing body 30. As shown in FIGS. 12 and 12B, the insert bore locking means includes at least one insert cut-away section 56. Each insert cut-away section 56 is positioned about insert bore periphery 53. It is preferred that the number of insert cut-away sections 56 equal the number of lugs 122. The number of lugs 122 and insert cut-away sections 56 is not critical and one lug 122 corresponding to one insert cut-away section 56 will suffice. However, two lugs 122 and two insert cut-away sections are preferred. Additionally, the shape of each lug 122 and each insert cut-away section 56 does not have to have an overall rectangular shape as shown in the drawings.

Figure 1B:
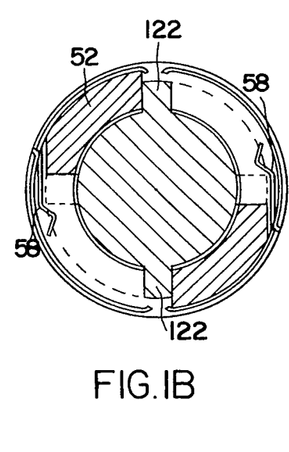
FIG. 1B is a partial cross-sectional front view along line 1B—1B, as shown in FIG. 1, of the tamper-resistant fluid connector.
Figure 13:
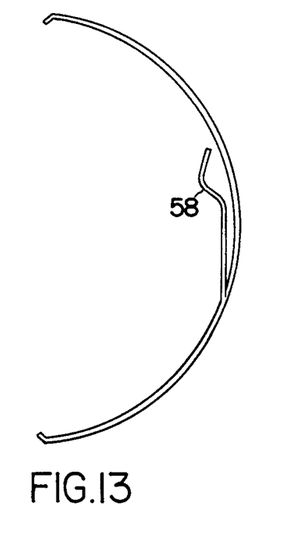
FIG. 13 is a front view of a flat leaf spring according to one embodiment of this invention.

With each lug 122 and each insert cut-away section 56 locked together, and with additional spring clip means for locking, a positive action is required to unlock lug 122 and cut-away section 56. Mere vibration will not unlock the mechanism. In one preferred embodiment as shown in FIG. 13, the spring clip means includes at least one resilient leaf spring finger 58, as shown in FIGs. IB and 13. The spring clip means retains each lug 122 within each corresponding insert cut-away section 56. Without the spring clip means, removable connector assembly 110 can be accidentally disconnected.

Figure 8:
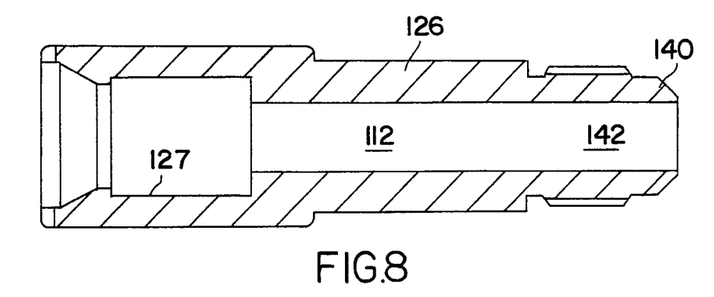
FIG. 8 is a cross-sectional view of a hose connector along line 8—8, as shown in FIG. 8A, according to one embodiment of this invention.
Figure 8A:
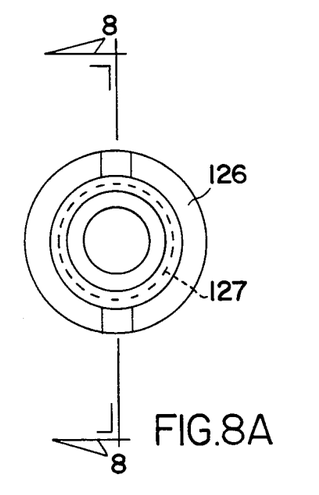
FIG. 8A is a front view of the hose connector as shown in FIG. 8.

In one embodiment as shown in FIGS. 1 and 8, outlet means includes shaft 140 secured to an outlet end of removable connector assembly 110. Shaft 140 defines an outlet through hole 142. Outlet through hole 142 is in communication with connector through hole 112. Additionally, shaft 140 has connecting means for connecting hose connector 126 to a hose or other conduit means and then to an appliance or other device requiring natural gas or another suitable fluid. Preferably, as shown in FIGS. 1 and 8, the connector means includes threaded shaft positioned on an end of hose connector 126.

Accordingly, it is appreciated that the disclosed preferred embodiments accomplish the objects of this invention. Obviously, many modifications and variations of this invention are possible, in light of the above teachings. It is therefore understood that, within the scope of the appended claims, this invention may be practiced otherwise as specifically described and can be varied considerably without departing from the basic principles of the invention.

We claim:

1. A tamper-proof fluid connector comprising:
a housing body having inlet means, a plug sealably and rotatably secured within said housing body, said plug having a plug through hole in communication with said inlet means;
retaining means comprising a spring positioned to force said plug against said housing body for seating said plug within said housing body, said retaining means lockable in a closed position, in said closed position communication being interrupted between said plug through hole and said inlet means;
a removable connector assembly, said removable connector assembly defining a connector through hole; and said removable connector assembly is engaged within said housing and then rotated with respect to said housing, said retaining means being unlocked from said closed position permitting communication between said inlet means, said plug through hole and said connector through hole; and
said removable connector assembly rotatably lockable with respect to said housing body, said removable connector assembly having outlet means in communication with said connector through hole.

2. A tamper-resistant fluid connector according to claim 1 further comprising a front cover, said front cover secured to said housing body.

3. A tamper-resistant fluid connector according to claim 2 wherein said front cover has a front cover bore.

4. A tamper-resistant fluid connector according to claim 3 wherein said front cover has at least one cover cut-away section positioned about a cover periphery of said front cover bore.

5. A tamper-resistant fluid connector according to claim 1 wherein said housing body further comprises securing means for securing said housing body with respect to a wall.

6. A tamper-resistant fluid connector according to claim 5 wherein said securing means further comprise a plurality of housing body through holes.

7. A tamper-resistant fluid connector according to claim 1 further comprising a wall cover plate, and said wall cover plate secured with respect to said housing body.

8. A tamper-resistant fluid connector according to claim 1 further comprising an access door hingedly mounted to said wall cover plate.

9. A tamper-resistant fluid connector according to claim 1 further comprising filter means for filtering fluid entering said plug through hole, and said filter means mounted within said inlet means.

10. A tamper-resistant fluid connector according to claim 9 wherein said filter means further comprise a screen.

11. A tamper-resistant fluid connector according to claim 1 wherein said inlet means further comprise an internally threaded inlet.

12. A tamper-resistant fluid connector according to claim 1 wherein said plug through hole forms approximately a 90 degree bend.

13. A tamper-resistant fluid connector according to claim 1 wherein said plug further comprises a tapered wall, a first body extension having a first body through hole, a second body extension having a second body through hole, said first body extension connected to a divergent end of said plug and extending parallel to a longitudinal axis of said plug, said second body extension connected to said first body portion and extending parallel to said longitudinal axis; and said plug through hole, said first body through hole and said second body through hole being in communication with each other.

14. A tamper-resistant fluid connector according to claim 13 wherein a transition from said tapered wall to said first body extension farms a shoulder, and a first body extension outer diameter is greater than a second body extension outer diameter.

15. A tamper-proof fluid connector according to claim 1 wherein said retaining means rotatably secures said plug with respect to said housing body.

16. A tamper-resistant fluid connector according to claim 15 wherein said retaining means further comprise a coil spring, said coil spring positioned around said first body extension, one end of said coil spring abutting a circumferential shoulder and an opposite end of said coil spring abutting a rotatable lock plate, said lock plate having a non-circular lock plate bore and said lock plate being slidably mateable with said first body extension.

17. A tamper-resistant fluid connector according to claim 16 further comprising a retaining plate, said retaining plate lockingly engageable with said lock plate, said retaining plate secured with respect to said housing body.

18. A tamper-resistant fluid connector according to claim 1 wherein said retaining means comprise a lock plate, a retaining plate, locking means for locking said lock plate to said retaining plate; and retaining means for lockingly engaging said retaining plate with said lock plate.

19. A tamper-resistant fluid connector according to claim 18 wherein said locking means comprise at least one tab, each said tab being connected to said lock plate about a plate periphery, and each said tab at least partially projecting out of a planar surface of said lock plate.

20. A tamper-resistant fluid connector according to claim 19 wherein said retaining means comprise said retaining plate defining a retaining plate bore, at least one retaining plate cut-away section positioned about a retaining plate bore periphery of said retaining plate bore, and each said tab lockingly engageable with each corresponding said retaining plate cut-away section.

21. A tamper-resistant fluid connector according to claim 18 further comprising a coiled spring forcing said locking means to be engaged with said retaining means in said closed position, and said locking means engageable with said retaining means for preventing said lock plate and said plug from rotating.

22. A tamper-resistant fluid connector according to claim 21 wherein said removable connector assembly further comprises a C-wall section projecting outward from a first end of a connector collar, said C-wall section abuts said lock plate, and upon inserting and rotating said removable connector assembly with respect to said housing body said lock plate is unlocked from and rotated with respect to said retaining plate.

23. A tamper-resistant fluid connector according to claim 1 wherein said removable connector assembly further comprises a hose connector a retaining ring, said retaining ring abutting an end of said hose connector and retaining said hose connector within a connector collar, and said retaining ring having a non-circular bore.

24. A tamper-resistant fluid connector according to claim 23 wherein said retaining ring defines a retaining ring periphery about said non-circular bore; and when said removable connector assembly is inserted within said housing body, said non-circular retaining bore lockingly engages with a non-circular first body extension connected to said plug and extending along a longitudinal axis of said plug.

25. A tamper-resistant fluid connector according to claim 24 wherein said non-circular bore has at least one retaining bore flat and said non-circular first body extension has at least one body extension flat.

26. A tamper-resistant fluid connector according to claim 1 wherein said removable connector assembly further comprises sealing means for sealing a hose connector of said removable connector assembly with respect to a body extension of said plug.

27. A tamper-resistant fluid connector according to claim 26 wherein said sealing means further comprise a gasket secured to an inner wall of said connector collar.

28. A tamper-resistant fluid connector according to claim 1 wherein said removable connector assembly further comprises a connector collar rotatably fitting within a central bore of said housing body and at least one lug projecting from a connector collar.

29. A tamper-resistant fluid connector according to claim 28 further comprising an insert ring, said insert ring defining an insert bore, and a front cover securing said insert ring within said central bore of said housing body.

30. A tamper-resistant fluid connector according to claim 29 wherein said insert ring further comprises insert bore locking means for engaging with each said lug to lock said connector collar with respect to said housing body.

31. A tamper-resistant fluid connector assembly according to claim 30 wherein said insert bore locking means further comprise said insert ring having at least one insert cut-away section about an insert bore periphery of said insert bore.

32. A tamper-resistant fluid connector assembly according to claim 31 wherein said insert bore locking means further comprise spring clip means for retaining each said lug in each said insert cut-away section; and said spring clip means forcing each said lug to lock within each said insert cut-away section.

33. A tamper-resistant fluid connector assembly according to claim 32 wherein said spring clip means further comprise at least one leaf spring finger connected to each said insert cut-away section.

34. A tamper-resistant fluid connector assembly according to claim 1 wherein said outlet means comprise a shaft secured to an outlet end of a hose connector of said removable connector assembly, said shaft defining an outlet through hole in communication with said connector through hole and said shaft having connecting means for connecting conduit means.

35. A tamper-resistant fluid connector comprising:
a housing body having an inlet, a tapered plug sealably and rotatably secured within said housing body, a rotatable lock plate, a retaining plate;
said tapered plug having a plug through hole in communication with said inlet;
said tapered plug having a tapered wall, a first body extension connected to a second body extension, said first body extension connected to said plug at a divergent end of said tapered wall, said second body extension connected to said first body extension and said first body connected to said plug along a longitudinal axis of said plug;
a spring positioned around said first body extension, one end of said spring abutting a shoulder of said plug and an opposite end of said spring abutting said rotatable lock plate;
said retaining plate lockingly engagable with said lock plate to rotate said plug with respect to said housing body;
a removable connector assembly comprising a connector collar, a C-wall section projecting from a first end of said connector collar, said C-wall abutting said lock plate, upon inserting and rotating said removable connector assembly with respect to said housing body said lock plate being unlocked from and rotatable with respect to said retaining plate;
said removable connector assembly having a retaining ring, said retaining ring non-rotatably mateable with said first body extension; upon inserting and rotating said removable connector assembly said lock plate being unlocked from said retaining plate and said retaining ring mating with said first body extension to rotate said tapered plug;
said removable connector assembly defining a connector through hole; in said open position said threaded inlet coupling, said plug through hole and said connector through hole in communication;
said removable connector assembly rotatably lockable with respect to a housing body insert ring, a front cover securing said housing body insert ring with respect to said housing body; and
said removable connector assembly having an outlet in communication with said connector through hole.

* * * * *